United States Patent
Daggy et al.

[15] 3,649,302
[45] Mar. 14, 1972

[54] PROCESS OF PRODUCING A READY-TO-SPREAD FROSTING

[72] Inventors: Elmer E. Daggy, Tenafly; Daniel Melnick, West Englewood, both of N.J.

[73] Assignee: CPC International Inc.

[22] Filed: Nov. 10, 1969

[21] Appl. No.: 875,549

[52] U.S. Cl. .................................................. 99/139
[51] Int. Cl. ................................................. A23g 3/00
[58] Field of Search ......................................... 99/139

[56] References Cited

UNITED STATES PATENTS

| | | | |
|---|---|---|---|
| 3,464,830 | 9/1969 | Wahba | 99/139 |
| 3,194,666 | 7/1965 | Bedenk | 99/139 |
| 3,253,928 | 5/1966 | Bedenk | 99/139 |

*Primary Examiner*—Raymond N. Jones
*Assistant Examiner*—J. M. Hunter
*Attorney*—Frank E. Robbins, Joseph Shekleton, Janet E. Price, Robert D. Weist, Martha A. Michaels and Dorothy R. Thumler

[57] ABSTRACT

Process for producing a light bodied, ambient temperature storable, ready-to-spread frosting, by turbulently mixing, at a temperature of 70°–120° F., a comminuted sugar phase with an emulsion wherein an edible glyceridic oil, having a melting point in excess of 90° F. and less than 120° F., is dispersed into an aqueous phase and said emulsion has from 1 part to 2.5 parts of the aqueous phase for each part of the specified glyceridic oil phase, the parts figures being by weight, and has from about 1.5 to 5.5 percent by weight, based on the emulsion, of a cold water swellable polysaccharide, and aerating the resulting mixture to form the prepared frosting.

15 Claims, No Drawings

PROCESS OF PRODUCING A READY-TO-SPREAD FROSTING

The invention relates to a light bodied, ambient temperature storable, ready-to-spread frosting.

An object of the invention is to provide a method for making a superior frosting of excellent texture and flavor which may be stored in ready-to-use form under normal ambient temperature storage conditions.

A further object of the invention is to provide a ready-to-spread ambient temperature storable frosting which will not segregate or degrade on exposure to temperature as high as 100° F. for 6 months or longer.

Yet another object of the invention is to provide a light bodied, ambient temperature storable, ready-to-spread frosting of reduced sweetness and that is highly resistant to drying out when used to top a cake.

Other objects of the invention will be apparent hereinafter from the description which follows and from the appended claims.

GENERAL DESCRIPTION OF THE INVENTION

In the broadest sense, the invention covers a process for producing a light bodied, ambient temperature storable, ready-to-spread frosting comprising turbulently mixing, at about 70° to about 120° F., a comminuted sugar phase with a glyceridic-oil-phase-in-aqueous-phase emulsion, to form a heavy bodied frosting composition. The weight ratio of the aqueous phase to the glyceridic oil phase is in the range from about 1 : 1 to about 2.5 : 1 and the emulsion contains from about 1.5 to 5.5 percent by weight of a cold water swellable polysaccharide. The turbulent mixing with the sugar phase, first conditioned at about 65° to about 85° F., is performed after the temperature of the emulsion is adjusted to fall between 90° and about 125° F. The heavy bodied frosting composition is aerated at about 80° to 100° F. to form a light bodied, ambient temperature storable, ready-to-spread frosting, that is highly resistant to drying out when used to top a cake.

The term "light bodied" is used to indicate that the frosting has an essentially foamed cellular structure. The preferred light bodied frosting of the invention has sufficient gas entrapped therein so as to have a specific gravity within the range from about 0.95 to about 1.2. By contrast, the heavy bodied composition, prior to the introduction of the gas, generally has a specific gravity within the range from about 1.25 to about 1.45. Light bodied frostings of the present invention have a more attractive opaque appearance, are easier to spread without tearing the crust of a cake, and have a softer, creamier, mouth-feel during ingestion.

The term "ambient temperature storable" is used to indicate that the frosting will not separate into its component parts or otherwise appreciably degrade when exposed to temperatures of up to about 100° F. for at least about 6 months.

The term "ready-to-spread" means that the frosting may be used by the housewife exactly as it is removed from the container without further addition of additives, beating, or any other manipulative techniques.

The term "oil-in-water emulsion" is used throughout for convenience to refer to a glyceridic-oil-phase-in-aqueous-phase emulsion. Both the glyceridic oil phase and the aqueous phase used to form the emulsion will usually have other components in addition to the glyceridic oil and water respectively. The compositions of the two phases will now be described in more detail.

It is essential to the practice of the invention that the aqueous phase, which is blended to form the oil-in-water emulsion, have from about 1.5 to about 5.5 percent by weight of a colloidal cold-water swellable polysaccharide in it based on the total oil-in-water emulsion weight. The polysaccharide serves as a bodying agent for the frosting, imparting to it improved resistance to phase separation. The dry weight of the cold-water swellable polysaccharide can constitute from about 0.5 to about 1.8 percent by weight of the complete frosting.

The aqueous phase at a temperature of about 60° to about 80° F. may also contain corn syrup; fungistats such as potassium sorbate and the like; salt; gelling agents such as propylene glycol alginate and the like; flavors; whitening agents such as titanium dioxide, and the like; artificial colors; preservatives such as calcium disodium ethylenediaminetetraacetic acid (EDTA) and the like; and emulsifying agents.

The glyceridic oil is an edible oil having a melting point in excess of 90° and less than 120° F. such as margarine oil, shortening, or butter oil. The glyceridic oil phase at a temperature of about 90° to about 135° F. must have an edible emulsifier such as mono- and/or di-glycerides, polyoxyethylene sorbitan monostearate (polysorbate 60), lecithin, or mixtures thereof. These emulsifiers, singly and/or in combinations, favor the formation of oil-in-water emulsions. The oil phase may also contain artificial oil soluble colors. A stabilizer such as a highly hydrogenated vegetable oil, which serves to raise the melting point of the glyceridic oil phase and thus prevent oil separation may also be present.

As was mentioned above, storability of the frosting at ambient temperature will not be satisfactory unless from about 0.5 to about 1.8 percent by weight of a colloidal cold-water swellable polysaccharide, based on the weight of the total frosting, is introduced into the frosting. The polysaccharide must be of a type that will hydrate to form a water sol. The size of the water sol particles should preferably be below about 5 microns and more preferably below about 1 micron. Most preferably the colloidal polysaccharide is dispersed into the aqueous phase that is used to form the oil-in-water emulsion.

Suitable colloidal polysaccharides include cold-water swellable cellulose and cold water swellable starch. Particularly preferred is a cold water swellable micro-crystalline cellulose which is water insoluble, but hydrates to a water sol; one such form of cellulose is marketed under the brand name of Avicel RC–501 (manufactured by American Viscose Division, FMC Corporation, Marcus Hook, Pa.). Avicel RC–501 type particles disperse into colloidal sols with particle sizes less than one micron in size. The colloidal sols serve to suspend the sugar. Preferably from about 0.8 to about 1.2 percent by weight of the cold-water swellable polysaccharide is used in the novel frosting.

The aqueous phase and the glyceridic oil phase may be blended together using any conventional emulsification technique, such as colloid mills, turbolizers with a high shear effect, or any other homogenizing device used to prepare oil-in-water emulsions. It is necessary, however, that the blending take place at a temperature of at least about 90° F. If lower temperatures are used, difficulty will be experienced in obtaining stable emulsions.

The oil-in-water emulsion temperature must be maintained in the range from about 90° to about 125° F., and more preferably to a temperature of 100°–110° F. before being mixed soon thereafter with the comminuted sugar phase.

The oil-in-water emulsion must be maintained throughout the manufacture, packaging, storage and use of the frosting; otherwise oil separation at elevated temperatures will result. It was surprising to find that in the frostings of this invention dehydration or drying out is greatly restricted despite the fact that the external phase of the emulsion (that exposed to the environment) is water.

The composition of the comminuted sugar phase is important. It should contain from about 2⅓ to about 9/11 part by weight sucrose for each 1 part by weight of dextrose. If the sugar phase contains no other additives, it should contain from about 45 to about 70 percent by weight sucrose and from about 30 to about 55 percent by weight dextrose. Both the dextrose and the sucrose must be finely divided. The commonly used 6X and 10X sucrose is suitable. The dextrose should be of about the same or smaller particle size. If sucrose is used in a smaller ratio to dextrose, the frosting will tend to harden at lower temperatures and become too soft at elevated temperatures, when it is subjected to temperature cycling. Use of sucrose at a higher ratio to dextrose will make the frosting noticeably overly sweet.

If a frosting is desired with a chocolate, cocoa, or other flavor, a comminuted flavoring material can be used to replace a portion of the total sugar phase. The ratio of sucrose to dextrose should, however, not fall outside the above specified range. As much as about 20 percent by weight of the sugar phase can be replaced with comminuted cocoa, or the like. Dried instant coffee powder may also be added in lesser amounts than cocoa or added in combination with the cocoa powder.

From about 55 parts to about 85 parts of the comminuted sugar phase maintained in the temperature range of 65°–85° F. and preferably 72° to 78° F. are blended with from about 45 parts to about 15 parts, respectively, of the oil-in-water emulsion, the parts figures being by weight. Preferably from about 65 parts to about 75 parts of the comminuted sugar phase are used, respectively, for each 35 parts to 25 parts in the oil-in-water emulsion, the parts figures being by weight.

It is essential to the practice of the invention that the comminuted sugar phase be turbulently mixed with the oil-in-water emulsion at a temperature in the range from about 70° to about 120° F. with the preferred range 85° to 105° F. This provides a smooth frosting of pleasing texture. A preferable method for obtaining this turbulent mixing is to impinge the emulsion and the comminuted sugar phase at a high velocity. Many commercial, high impact, liquid-solid mixers are available which can readily accomplish the required turbulent mixing. The J. H. Day Centri-Flo Solids-Liquids Blender, a Fitzpatrick Malaxator, and the continuous type Littleford-Lodige Precision Mixer are only three examples of many such mixers.

One pass, in a continuous process, through a high impact instantaneous mixer such as the J. H. Day Centri-Flo Solids-Liquids Blender, possesses many commercial advantages over the use of a batch mixer. Shelf life of the frosting is promoted and a deaerated high density frosting results. The high density frosting can be aerated with a non-reactive gas. The glyceridic oil will not separate or spoil.

Recycle or batch mixing systems, although usable, must be carefully regulated to avoid breakdown of the emulsion (phase separation). A frosting made by working in the batch process cannot withstand storage at the elevated temperatures which often prevail at retail outlets for long periods of time without separation of the oil at the surface.

A relatively heavy bodied frosting composition will result from the turbulent mixing of the sugar phase with the oil-in-water emulsion. To obtain a truly light bodied composition suitable for use as a ready-to-spread frosting, it is necessary to aerate the heavy bodied composition with a gas, preferably a non-reactive gas such as nitrogen. Although air may also be used, the resulting frosting will not have the maximum flavor life attainable when the preferred non-reactive gas is used.

The aeration at about 80° to about 100° F. may be accomplished by any convenient technique. For example, the gas can be forced through small orifices into the heavy bodied composition as the composition flows through a tube or vessel into a mixing chamber for uniform distribution of the gas. Once the aeration is completed, the density of the composition will be much reduced and it will be converted into a light bodied, ready-to-spread frosting that is stable and storable at ambient temperature. Any edible non-reactive gas may be used in the preferred composition; for example, nitrogen, nitrous oxide, carbon dioxide, or the like. The final product is packaged immediately thereafter at a temperature range of 85° to 95° F.

The invention will be better understood by reference to the examples which follow. The examples are meant to be illustrative only, and the invention, of course, is not to be limited thereto. All percentage and part figures are percentage and part by weight unless otherwise specifically designated.

EXAMPLE I

Preparation of Vanilla Flavored Frosting

An aqueous phase was formulated using 9.0 percent corn syrup, 0.3 percent propylene glycol alginate, 0.9 percent vanilla flavor, 0.6 percent titanium dioxide, 0.6 percent of a butter-flavor mixture comprising butyric acid, diacetyl and acetyl methyl carbinol, 3.0 percent microcrystalline cellulose (Avicel RC-501), 0.20 percent potassium sorbate, 0.00472 percent calcium disodium EDTA, 1.8 percent sodium chloride, and 36.0 percent water. These concentrations are expressed in terms of the final oil-in-aqueous phase emulsion prepared.

An oil phase was formulated using 33.0 percent partially hydrogenated margarine oil with an iodine value of 98.6 and a melting point of 95.5° F., 12.0 percent of a glyceridic vegetable oil stabilizer having an iodine value of 46 and a melting point of 121° F., 0.24 percent polyoxyethylene sorbitan monostearate, 0.1 percent sorbic acid, 1.8 percent mono- and di-glycerides, and 0.08 percent yellow food color. Here also, the concentrations are expressed in terms of the final oil-in-water emulsion.

The oil phase was heated to a temperature of approximately 125° F. About 52 parts of the aqueous phase formulated at approximately 70° F. and about 47 parts of the oil phase were blended in a Charlotte Colloid Mill to form an oil-in-water emulsion. The temperature of the mixture, and the emulsion formed from the mixture, was approximately 90° F. The resulting oil-in-water emulsion was passed through a heat exchanger (Votator) and heated therein to a temperature of 102° F.

A sugar phase was formulated using equal quantities of 6X powdered sucrose and fine mesh powdered dextrose, i.e., each component being 50 percent of the comminuted sugar phase. The sugar blend temperature was approximately 72° F.

The emulsion (33 parts) and the sugar phase (67 parts) were blended together using a J. H. Day Centri-Flo Solids-Liquids Blender. This resulted in the formation of a heavy bodied frosting composition with a temperature of about 90° F. and with a specific gravity of 1.36.

The heavy bodied frosting composition was forced through a pipe where nitrogen gas was injected into the composition in the form of minute bubbles and then into a mixing chamber for uniform distribution of the gas. A light bodied frosting was produced with a specific gravity of 1.08; product temperature was about 90° F. at the time of packaging. The frosting had excellent storability at temperatures of up to 100° F. for times as long as 6 months. It could be readily spread on cakes and was delicious in flavor and pleasing in mouthing texture. The frosting did not separate or otherwise degrade when subjected to repeated temperature cycling in the range from 70° to 100° F.

EXAMPLE II

Preparation of Milk Chocolate Flavored Frosting

An aqueous phase was formulated using 8.20 percent corn syrup, 0.27 percent propylene glycol alginate, 0.27 percent vanilla flavor, 1.36 percent salt, 5.46 percent dry whole milk solids, 0.19 percent potassium sorbate, 0.00423 percent calcium disodium EDTA, 0.0054 percent butter flavor, 2.73 percent Avicel RC-501, and 38.54 percent water. These concentrations are expressed in terms of the final oil-in-water emulsion prepared.

An oil phase was formulated using 32.0 percent partially hydrogenated margarine oil with an iodine value of 98.6 and a melting point of 95.5, 9.0 percent of a hydrogenated glyceridic vegetable oil stabilizer having an iodine value of 34.0 and a melting point of 128.5, 0.20 percent parts polyoxyethylene sorbitan monostearate, 0.08 parts sorbic acid and 1.67 parts mono- and di-glycerides. Here also, concentrations are expressed in terms of the final oil-in-water emulsion.

The oil phase was heated to a temperature of 130° F. About 57 parts of the aqueous phase at about 65° F. and about 43 parts of the oil phase were blended in a Charlotte Colloid Mill to form an oil-in-aqueous phase emulsion. The temperature of the mixture, and the emulsion formed from the mixture, was approximately 92° F. The resulting oil-in-water emulsion was passed through a heat exchanger (Votator) and heated to a temperature of 105° F.

56.0 Parts of a sugar phase at about 74° F. made with equal parts of 6X sucrose and fine mesh powdered dextrose, 8.0 parts powdered Dutch process cocoa, and 36.0 parts of the emulsion were blended together using a J. H. Day Centri-Flo Solids-Liquids Blender. This resulted in the formation of a heavy bodied frosting composition having a specific gravity of 1.34 and a temperature of 95° F.

The heavy bodied frosting composition was forced through a pipe where nitrogen gas was injected into the composition in the form of minute bubbles and then into a mixing chamber for uniform distribution of the gas. A light bodied frosting of about 95° F. in temperature was produced with a specific gravity of 1.11. This frosting had excellent stability at temperatures up to 100° F. for as long as 6 months. It could be readily spread on cakes and was of excellent milk chocolate flavor and texture.

EXAMPLE III

Preparation of Chocolate Fudge Flavored Frosting

An aqueous phase was formulated using 40.68 percent water, 11.07 percent corn syrup, 0.28 percent propylene glycol alginate, 1.38 percent salt, 0.11 percent vanilla flavor, 0.15 percent potassium sorbate, 0.00430 percent calcium disodium EDTA, 0.022 percent butter flavor, and 2.77 percent Avicel RC–501. These concentrations are expressed in terms of the final oil-in-water emulsion prepared.

An oil phase was formulated using 30.44 percent partially hydrogenated margarine oil with an iodine value of 98.6 and a melting point of 95.5° F, 11.07 percent of a glyceridic vegetable oil stabilizer having an iodine value of 46 and a melting point of 121° F., 0.21 percent parts polyoxyethylene sorbitan monostearate, 0.08 parts sorbic acid, and 1.70 parts mono- and di-glycerides. Here also, concentrations are expressed in terms of the final oil-in-water emulsion.

The oil phase was heated to a temperature of 125° F. About 43.5 parts of the aqueous phase at about 75° F. and about 56.5 parts of the oil phase were blended in a Charlotte Colloid Mill to form an oil-in-water emulsion. The temperature of the mixture and the emulsion formed from the mixture was approximately 90° F. The resulting oil-in-water emulsion was passed through a heat exchanger (Votator) and heated to a temperature of 105° F.

About 60.4 parts of a sugar phase made as described in Example I, 3.0 percent Dutch process cocoa and 36.6 parts of the emulsion were blended together using a J. H. Day Centri-Flo Solids-Liquids Blender. This resulted in the formation of a heavy bodied frosting composition of specific gravity 1.34 and about 94° F. in temperature.

The heavy bodied frosting composition was forced through a pipe where nitrogen gas was injected into the composition in the form of minute bubbles and then into a mixing chamber for uniform distribution of the gas. A light bodied frosting of about 99° F. in temperature was produced with a specific gravity of 1.08. This frosting had excellent stability at temperatures up to 100° F. for as long as 6 months. It could be readily spread on cakes and was of excellent chocolate fudge flavor and texture.

EXAMPLE IV

Preparation of Vanilla Flavored Frosting Using Littleford-Lodige Precision Mixer of the Continuous Type The process as described in Example I was repeated to the point where a 105° F. emulsion and a sugar phase with a temperature of approximately 72° F. were available.

The sugar phase was then blended continuously with the oil-in-water emulsion in a Littleford-Lodige Precision Mixer of the continuous type. During this blending operation, gaseous nitrogen was introduced into the mixture by nitrogen blanketing the total frosting blend while it was being blended inside the Littleford-Lodige Mixer. Air was thereby excluded from the frosting. An aerated frosting of about 95° F. in temperature and having a specific gravity of 1.0 was obtained.

Once again, a room temperature storable, ready-to-spread frosting of light body and excellent spreadability, flavor, and texture was obtained.

CONCLUSION

As a result of this invention, it is possible to make a light bodied, room temperature storable, ready-to-spread frosting of extremely high quality, flavor, texture, and highly resistant to drying out. Further, it is possible to make this frosting with a portion of the sucrose being replaced by dextrose. This provides a product that is of a less sweet and hence a more pleasing flavor than ordinary sucrose-based frostings. The criticality of utilizing a colloidal cold-water swellable polysaccharide in the composition and the necessity of formulating an oil-in-water emulsion at a temperature of at least about 90° F. has been particularly pointed out.

While the invention has been described in connection with specific embodiments thereof, it will be understood that it is capable of further modification, and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth, and as fall within the scope of the invention.

That which is claimed is:

1. A process for producing a storable aerated light bodied frosting comprising
    turbulently mixing, at a temperature in the range from about 70° to about 120° F.
        from about 55 to about 85 parts, by weight, of a comminuted sugar composition having a temperature of from about 65° to 85° F., said sugar composition consisting of from about 45 to 70 percent, by weight, sucrose, and from about 30 to 55 percent, by weight, dextrose; and
        from about 15 to about 45 parts, by weight, of a glyceridic-oil-phase-in-aqueous-phase emulsion having from about 1 part to about 2.5 parts of the aqueous phase for each part of the glyceridic oil phase, the parts figures being by weight, said aqueous phase including from about 1.5 to about 5.5 percent, by weight based on the emulsion weight, of a colloidal cold-water swellable polysaccharide, to form a heavy bodied frosting; and
    aerating the heavy bodied frosting within a temperature range of 80° to 100° F. with a non-reactive gas to form the storable aerated light bodied frosting.

2. A process in accordance with claim 1 wherein from about 65 to 75 parts by weight, sugar composition and from about 25 to 35 parts, by weight of the emulsion are turbulently mixed.

3. A process in accordance with claim 1 wherein the glyceridic oil is an edible oil having a melting point in excess of 90° F. and less than 120° F.

4. A process in accordance with claim 1 wherein the non-reactive gas is selected from the group consisting of nitrogen, carbon dioxide, nitrous oxide, and mixtures thereof.

5. A process in accordance with claim 1 wherein the colloidal cold-water swellable polysaccharide is selected from the group consisting of cold-water swellable cellulose and cold-water swellable starch.

6. A process in accordance with claim 1 wherein the emulsion includes corn syrup, propylene glycol alginate, flavor, potassium sorbate, a calcium disodium salt of ethylene diaminetetraacetic acid, polyoxyethylene sorbitan monostearate, sorbic acid, mono- and di-glycerides, and coloring material.

7. A process in accordance with claim 1 wherein as much as about 20 percent by weight of the sugar phase is replaced with a solid comminuted flavoring material.

8. A process for producing a light bodied, ambient temperature storable, ready-to-spread frosting comprising mixing together an aqueous phase having a temperature of about 60° to about 80° F. and consisting of water and from about 1.5 to about 5.5 percent, by weight of a colloidal cold-water swellable polysaccharide, the percentage being based on the emulsion weight, and a glyceridic oil phase including an edible emulsifier, having a temperature in the range from about 90° to about 125° F.; the weight ratio of the aqueous phase to oil phase being from about 1 to about 2.5, emulsifying at a temperature of at least about 90° F. the mixture to form an oil-in-water emulsion;

maintaining the emulsion at a temperature in the range from about 90° to about 125° F.

turbulently mixing at a temperature in the range of from about 70° to 120° F. a comminuted sugar composition having a temperature of 65° to 85° F. said sugar composition consisting of from about 45 to 70 percent, by weight, sucrose, and from about 30 to 55 percent, by weight, dextrose; and the emulsion to form a heavy bodied frosting composition; and aerating the heavy bodied frosting composition within a temperature range of 80° to 100° F. with an non-reactive gas to form the light bodied, ambient temperature storable, ready-to-spread frosting.

9. A process in accordance with claim 8 wherein the emulsion constitutes from about 25 percent to about 40 percent and the sugar phase from about 60 to about 75 percent of the frosting, the percentage figures being by weight.

10. A process in accordance with claim 8 wherein the glyceridic oil is an edible oil having a melting point in excess of 90° and less than 120° F.

11. A process in accordance with claim 8 wherein the non-reactive gas is selected from the group consisting of nitrogen, carbon dioxide, nitrous oxide, and mixtures thereof.

12. A process in accordance with claim 8 wherein the colloidal cold-water swellable polysaccharide is a microcrystalline cellulose.

13. A process in accordance with claim 8 wherein the aqueous phase includes corn syrup, propylene glycol alginate, flavor, potassium sorbate, and a calcium disodium salt of ethylenediaminetetraacetic acid.

14. A process in accordance with claim 8 wherein the sugar composition of substantially equal parts of powdered sucrose and powdered dextrose.

15. A process in accordance with claim 8 wherein the oil phase includes polyoxyethylene sorbitan monostearate, sorbic acid, mono- and di-glycerides, and coloring material.

* * * * *